No. 881,907. PATENTED MAR. 17, 1908.
A. A. DAILEY.
HOOP SHAVING MACHINE.
APPLICATION FILED JUNE 24, 1907.
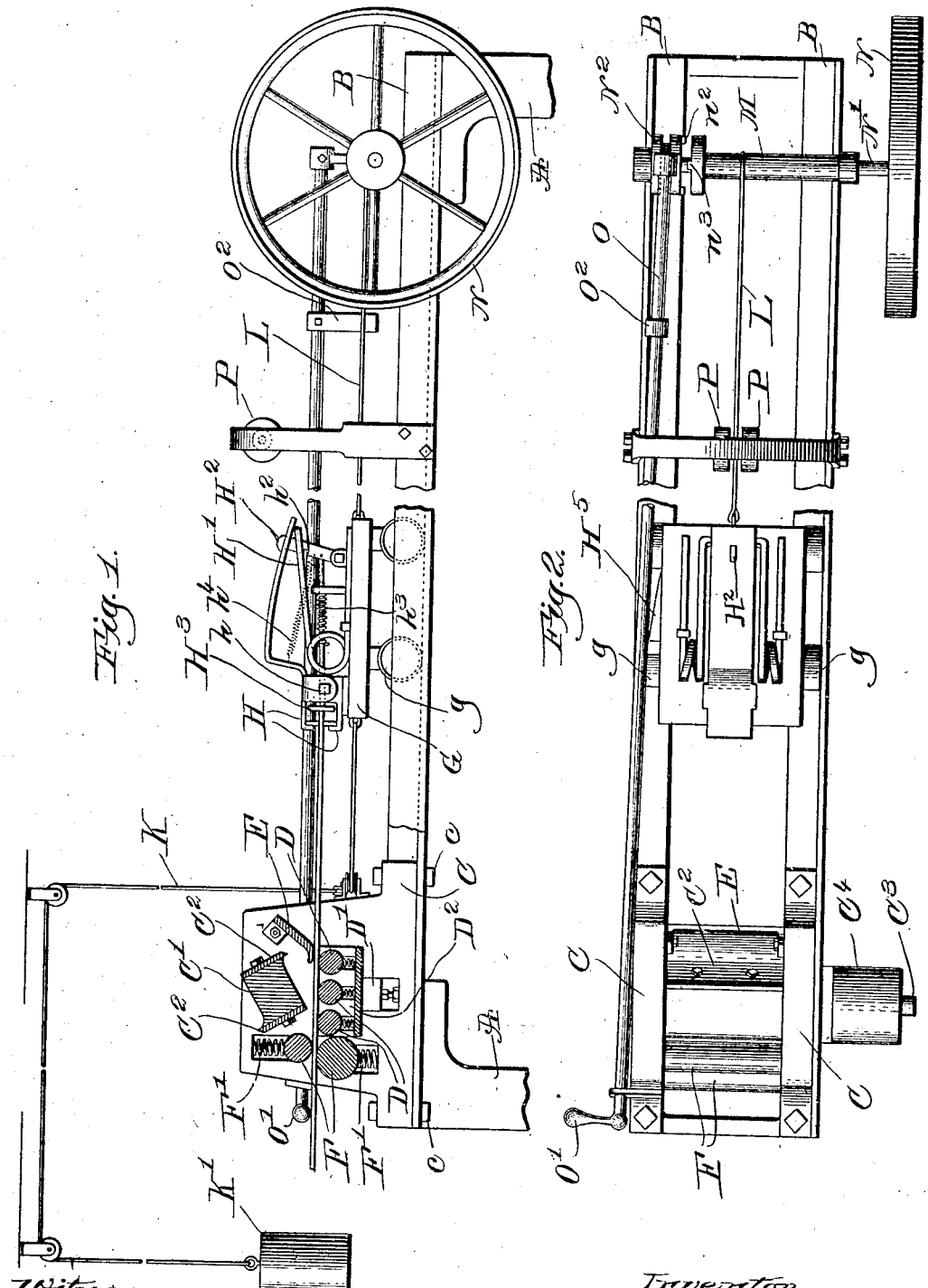
Witnesses.
Thomas J. Drummond
Joseph M. Ward.
Inventor.
Adelbert A. Dailey,
by Crosby & Gregory attys.

UNITED STATES PATENT OFFICE.

ADELBERT A. DAILEY, OF VINAL HAVEN, MAINE.

HOOP-SHAVING MACHINE.

No. 881,907.  Specification of Letters Patent.  Patented March 17, 1908.

Application filed June 24, 1907. Serial No. 380,417.

*To all whom it may concern:*

Be it known that I, ADELBERT A. DAILEY, a citizen of the United States, and a resident of Vinal Haven, in the county of Knox and State of Maine, have invented an Improvement in Hoop-Shaving Machines, of which the following description, in connection with the accompanying drawing, is a specification, like letters on the drawing representing like parts.

This invention relates to a machine designed primarily for the shaving or planing of saplings in the manufacture of barrel hoops but which is useful for any other similar purpose.

The invention resides in a machine in which the rotating cutter frame is mounted at one end of a supporting frame, and in which a carriage travels back and forth toward and away from the cutter frame to draw the work through the cutter together with various devices securing the automatic action in various of its movements.

The nature of the invention will best appear from the accompanying description and the drawings and will be particularly pointed out in the appended claims.

The drawings represent a machine embodying the invention in its preferred form.

Figure 1 is a side elevation of the upper portion of the machine partly with the central portion broken away and with the cutter frame partly in cross section; Fig. 2 is a top plan view of the machine with the central portion broken away.

The machine comprises a suitable supporting frame, the legs of which are represented at A. A trackway upon which the gripping device to be described travels extends substantially throughout the length of the machine, and is herein shown as formed of two angle irons B, B, extending from one pair of legs, A, A, to the other and connecting the same to form the rigid frame. These angle irons serve themselves as the rails of the trackway.

The cutter frame C is located at the forward end of the machine and is bolted in place by the bolts $c$. The cutter $C'$ is of the rotary type comprising in the form shown two cutting blades $C^2$, and is mounted on a shaft $C^3$ which is driven by the pulley $C^4$ from any suitable source of power. The work is held up against the cutter by a series of yieldingly-mounted bed rolls D. These rolls are all mounted on the support $D'$ which is adjustable toward and from the path of the cutter frame by means of a set screw and check nut. Each roll D is yieldingly-mounted upon the support $D'$ by means of the springs $D^2$. A guide bar E is mounted in the cutter frame in the rear of the cutter and its lower edge is adjusted to the same height as the lowest point of the path of the cutter.

The adjustment of the support $D'$ enables work of varying thicknesses to be passed through the cutter frame and determines the amount to be removed by the cutter.

The provision for the independent yielding of each of the bed rolls D enables work of irregular form or of imperfect character, such for example as the knotted or irregular side of the sapling to pass through the cutter, each bed roll yielding one after the other for that purpose.

The springs holding the bed rolls up to the work are of sufficient strength that any two of them will hold the work up into cutting position.

A pair of guide or directing rolls F are mounted in front of the cutter and the bed rolls and are each yieldingly pressed toward the other by means of the springs $F'$. The upper roll is set slightly in the rear of the lower so that when the work is guided in beneath the cutter it will be pressed downwardly against the bed roll and its passage beneath the guide bar E assured.

The work is drawn through the cutter frame by means of a gripping device mounted on a carriage which travels back and forth toward and away from the cutter head upon the trackway B. This carriage is shown at G as comprising a truck provided with four wheels $g$ running on the rails B. The truck G carries the gripping device shown as a pair of oppositely disposed gripping jaws H pivoted with respect to each other at $h$ and normally held closed by the spring $H'$ pressing against the longer arms of the jaws. A latch $H^2$ is pivoted upon one of the jaws and provided with a notch $h^2$ adapted to engage with and hold pressed the other jaw against the action of the spring $H'$. A plunger $H^3$ is mounted to extend between the gripping end of the jaws and to contact or be connected with the latch $H^2$, and is normally held in its forward position by a spring $h^3$. This spring $h^3$ when the plunger is connected to the latch will serve to cause the notch $h^2$ of the latch to engage the pivoted jaw when it is depressed, but if the plunger is not connected with the latch a separate spring $h^4$ may be employed to hold the latch up in engaging position. The carriage is moved forward toward the cutter head by means of a rope or chain K provided with suitable counterweights K'. The carriage is drawn away from the cutter head to draw the work past the cutter by means of a rope or chain L which is wound up on the sleeve M by means of a pulley N which is driven by any suitable motor. The sleeve M is loosely mounted upon the shaft N' of the pulley and is connected thereto to be driven thereby by a suitable clutch mechanism, herein shown as a sleeve $N^2$ splined upon the shaft N' and moved so that its lugs $n^2$ engage the corresponding lugs $n^3$ on the sleeve M by means of the rod O. The rod O extends to the forward end of the machine and is provided with a suitable operating handle O' so that when the handle O' is turned the clutch is operated to cause the sleeve M to be connected with and driven by the shaft N'. When the rod is turned in the opposite direction the clutch will be released allowing the sleeve M to turn freely on the shaft N'. The releasing of the clutch is secured automatically by providing the rod O with a depending lug $O^2$ adapted to be struck by a cam projection $H^5$ on one side of the carriage when the carriage reaches the desired limit of its rearward movement. The gripping jaws upon the carriage are also opened automatically to release the work after it is drawn through the cutter-head and before the return movement of the carriage begins by means of rolls P mounted upon the frame of the machine and in the path of movement of the upper gripper jaw. As the carriage carries the gripper jaws beneath the rolls P they act by reason of the inclination of the jaw to depress the upper jaw and release the work. The spring plunger $H^3$ then acts to push the work out from between the jaws so that it may drop btween the rails B onto the floor, and upon the continued movement of the carriage the latch $H^2$ catches and holds the jaws open.

From the foregoing description of the machine its operation will be obvious. The work is directed in between the guide rolls F beneath the cutter and guide and over the bed rolls which are properly adjusted, and then it is forced in between the gripper jaws which are at that time held open by the latch. The work pushes back the plunger $H^3$ releasing the latch, causing the jaws to grip the work, and the operator then turns the handle O' locking the clutch $N^2$ and the carriage is thereby moved backwardly by the power applied to the pulley N until the work is drawn through the cutter head. The rolls P open the jaws, the plunger $H^3$ pushes the work out from the jaws and it falls on the floor and immediately thereafter the cam $H^5$ acting on lug $O^2$ releases the clutch and the weight K' at once acts to return the carriage to its forward position.

Having described my invention what I claim as new and desire to secure by Letters Patent is:—

1. In a shaving machine, a supporting frame comprising a trackway, a cutter frame located at one end of said trackway on said frame, a rotary cutter mounted in said cutter frame, a carriage mounted to run on said trackway and provided with a gripping device, means for drawing the carriage away from the cutter frame to draw the work therethrough, means for automatically releasing the work from the gripping device allowing it to fall through the trackway, and means for automatically returning the carriage to the cutter frame after the release of the work and means operated by the work to permit the jaws to grip the work.

2. In a shaving machine, a supporting frame comprising a trackway, a cutter frame located at one end of said trackway on said frame, a rotary cutter and opposing yieldingly mounted bed rolls mounted in said cutter frame, a carriage mounted to run on said trackway and provided with a gripping device, means for drawing the carriage away from the cutter frame to draw the work therethrough, means for automatically releasing the work from the gripping device allowing it to fall through the trackway, and means for automatically returning the carriage to the cutter frame after the release of the work and means operated by the work to permit the jaws to grip the work.

3. In a shaving machine, a supporting frame comprising a trackway, a cutter-frame located at one end of said trackway on said frame, a rotary cutter, a transverse guide bar, opposite opposing yieldingly-mounted bed rolls, and a pair of yielding guide rolls all mounted on said cutter frame, a carriage mounted to run on said trackway and provided with a gripping device, means for drawing said carriage away from the cutter frame to draw the work therethrough, means for automatically releasing the work from the gripping device allowing it to fall through the trackway, and means for automatically returning the carriage to the cutter frame after the release of the work.

4. In a shaving machine, a supporting frame, comprising a trackway, a cutter frame provided with a cutting mechanism at the forward end of said trackway, a carriage mounted to run on said trackway, a pair of gripping jaws mounted on said carriage and pivoted with respect to each other, a spring normally acting to close said jaws, a latch for holding said jaws in open position, a plunger extending between said jaws and engaging said latch whereby when the plunger is retracted the jaws will be closed by the closing of the spring.

5. In a shaving machine, a supporting frame comprising a trackway, a cutter frame provided with a cutting mechanism at the forward end of said trackway, a carriage mounted to run on said trackway, a pair of gripping jaws mounted on said carriage and pivoted with respect to each other, a spring normally acting to close said jaws, a latch for holding the jaws in open position, a plunger extending between said jaws and engaging said latch whereby when the plunger is retracted the jaws will be closed by the closing of the spring, means for yieldingly-pressing said plunger and latch into position for holding the jaws open.

6. In a shaving machine, a supporting frame comprising a trackway, a cutter-frame provided with a cutting mechanism at the forward end of the trackway, a carriage mounted to run on said trackway, a pair of gripping jaws mounted on said carriage and pivoted with respect to each other, a spring normally acting to close said jaws, a latch for holding said jaws in open position, a plunger extending between said jaws and engaging said latch whereby when the plunger is retracted the jaws will be closed by the closing of the spring, means located on the supporting frame adjacent the rear end thereof acting as the carriage passes to open the jaws and allow the work to drop.

7. In a shaving machine, a supporting frame comprising a trackway, a cutter-frame provided with a cutting mechanism at the forward end of said trackway, a carriage mounted to run on said trackway, a pair of gripping jaws mounted on said carriage and pivoted with respect to each other, a spring normally acting to close said jaws, a latch for holding the jaws in open position, a plunger extending between said jaws and engaging said latch whereby when the plunger is retracted the jaws will be closed by the closing of the spring, means for yieldingly-pressing said plunger and latch into position for holding the jaws open, and means located on the supporting frame adjacent the rear end thereof acting as the carriage passes to open the jaws and allow the work to drop.

8. In a shaving machine, a supporting frame comprising a trackway, a cutter-frame provided with a cutting mechanism at the forward end of said trackway, a carriage mounted to run on said trackway, a pair of gripping jaws mounted on said carriage and pivoted with respect to each other, a spring normally acting to close said jaws, a latch for holding said jaws in open position, a plunger extending between said jaws and engaging said latch whereby when the plunger is retracted the jaws will be closed by the closing of the spring, means located on the supporting frame adjacent the rear end thereof acting as the carriage passes to open the jaws and allow the work to drop, and means operated by the further movement of the carriage to reverse the movement of the carriage and allow its return to forward position.

9. In a shaving machine, a supporting frame comprising a trackway, a cutter-frame provided with a cutting mechanism at the forward end of said trackway, a carriage mounted to run on said trackway, a pair of gripping jaws mounted on said carriage and pivoted with respect to each other, a spring normally acting to close said jaws, a latch for holding the jaws in open position, a plunger extending between said jaws and engaging said latch whereby when the plunger is retracted the jaws will be closed by the closing of the spring, means for yieldingly-pressing said plunger and latch into position for holding the jaws open, means located on the supporting frame adjacent the rear end thereof and acting as the carriage passes to open the jaws and allow the work to drop, and means operated by the further movement of the carriage to reverse the movement of the carriage and allow its return to forward position.

In testimony whereof, I have signed my name to this specification, in the presence of two subscribing witnesses.

ADELBERT A. DAILEY.

Witnesses:
 JAMES I. CARVER,
 H. B. CARVER.